(12) United States Patent
Kumar

(10) Patent No.: US 10,248,619 B1
(45) Date of Patent: Apr. 2, 2019

(54) RESTORING A VIRTUAL MACHINE FROM A COPY OF A DATASTORE

(71) Applicant: EMC IP Holding Company LLC, Hopkinton, MA (US)

(72) Inventor: Sunil Kumar, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1162 days.

(21) Appl. No.: 13/629,821

(22) Filed: Sep. 28, 2012

(51) Int. Cl.
*G06F 16/11* (2019.01)
*G06F 16/16* (2019.01)
*G06F 16/188* (2019.01)

(52) U.S. Cl.
CPC .......... *G06F 16/188* (2019.01); *G06F 16/116* (2019.01); *G06F 16/166* (2019.01)

(58) Field of Classification Search
USPC ................................................. 707/613, 615
See application file for complete search history.

(56) References Cited

U.S. PATENT DOCUMENTS

| | | | | |
|---|---|---|---|---|
| 2010/0073148 | A1* | 3/2010 | Banks | H04L 1/1867 340/286.02 |
| 2012/0265959 | A1* | 10/2012 | Le | G06F 17/30067 711/162 |
| 2012/0303858 | A1* | 11/2012 | Ginzton | G06F 9/45533 711/6 |
| 2012/0324183 | A1* | 12/2012 | Chiruvolu | G06F 11/2038 711/162 |
| 2013/0282653 | A1* | 10/2013 | Tandra Sistla | G06F 9/45558 707/610 |

* cited by examiner

*Primary Examiner* — James Trujillo
*Assistant Examiner* — Fariborz Khoshnoodi
(74) *Attorney, Agent, or Firm* — Daly, Crowley Mofford & Durkee, LLP

(57) ABSTRACT

In one aspect, a method to restore a virtual machine comprising receiving a selection of a point-in-time copy to restore, retrieving catalog information associated with the point-in-time copy of the virtual machine to restore, mounting a datastore on a host, modifying a virtual machine configuration file path, registering modified virtual machine configuration file path with the host, determining a snapshot ID of a snapshot of the virtual machine and reverting to the snapshot of virtual machine.

19 Claims, 5 Drawing Sheets

RESTORING A VIRTUAL MACHINE FROM A COPY OF A DATASTORE

BACKGROUND

Over time virtual environments have been used increasingly in storage environment and the scale of their deployment has also increased. For example, a virtual environment may include hundreds to thousands of objects. These objects are added, removed or changed over time. It is important for a host connected to the virtual environment to account for these objects.

SUMMARY

In one aspect, a method to restore a virtual machine comprising receiving a selection of a point-in-time copy to restore, retrieving catalog information associated with the point-in-time copy of the virtual machine to restore, mounting a datastore on a host, modifying a virtual machine configuration file path, registering modified virtual machine configuration file path with the host, determining a snapshot ID of a snapshot of the virtual machine and reverting to the snapshot of virtual machine.

In another aspect, an article includes a non-transitory machine-readable medium that stores executable instructions to restore a virtual machine. The instructions cause a processor to receive a selection of a point-in-time copy of the virtual machine to restore, retrieve catalog information associated with the point-in-time copy of the virtual machine to restore, mount a datastore on a host, modify a virtual machine configuration file path, register the modified virtual machine configuration file path with the host, determine a snapshot ID of a snapshot of the virtual machine and revert to the snapshot of virtual machine.

In a further aspect, an apparatus includes electronic hardware circuitry to restore a virtual machine. The circuitry is configured to receive a selection of a point-in-time copy to restore, retrieve catalog information associated with the point-in-time copy of the virtual machine to restore, mount a datastore on a host, modify a virtual machine configuration file path, register modified virtual machine configuration file path with the host, determine a snapshot ID of a snapshot of the virtual machine and revert to the snapshot of virtual machine.

DETAILED DESCRIPTION

Replicating a datastore (e.g., a VMWARE® datastore) using a continuous data protection (CDP) system provides a very good recovery point objective (RPO). In a disaster, where a user loses an entire site (e.g., a production site or a replication site), a user may use any past point-in-time copy of a datastore to restore the entire datastore.

Restoring from a point-in-time copy of a datastore is useful in a disaster or a site failure where the user may want to restore all of the virtual machines on the datastore. In some examples, a single datastore may include up to a hundred virtual machines. In most of the day-to-day business environments, corruption or a failure happens at a single virtual machine. Users would like to restore just the individual impacted virtual machine, which includes corrupted data rather than impacting the other virtual machines on the data store.

As described herein a new approach to restore (recover) a virtual machine using a point-in-time copy of a datastore (e.g., VMWARE® datastore) reduces the recovery time objective (RTO) drastically. For example, recovering an entire datastore may take several hours, for example, depending on the size of the datastore. For example if a 10 Gigabyte datastore takes an hour to recover a 100 Gigabyte datastore takes ten hours to restore. Using the techniques described herein a single virtual machine may only take a minute or so to restore irrespective of the size of the entire datastore.

Figure 1:
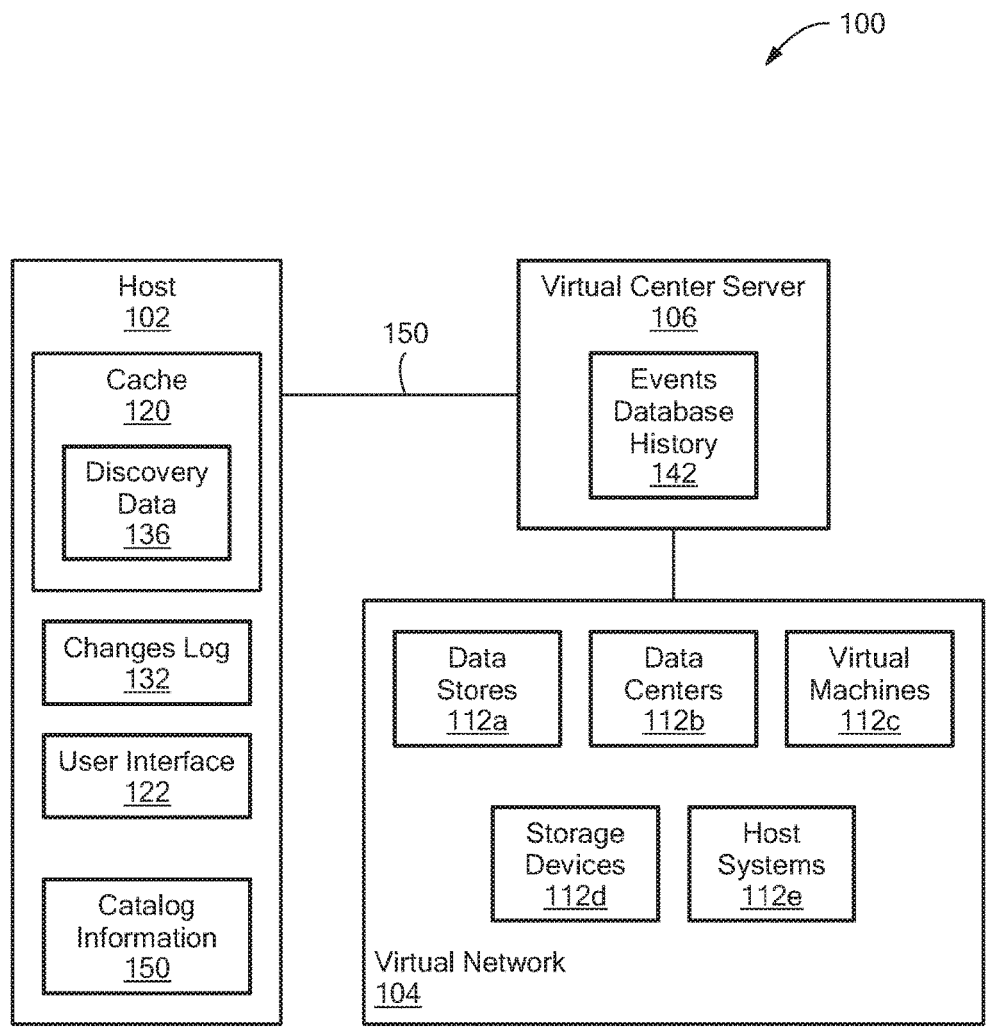
FIG. 1 is a block diagram of an example of a system that includes a virtual network.

Referring to FIG. 1, a system 100 includes a host 102, a virtual center server 106 and a virtual network 104. The virtual network 104 includes objects such as data stores 112$a$, data centers 112$b$, virtual machines 112$c$, storage devices 112$d$ and host systems 112$e$. The host 102 includes a cache 120 and a user interface 122. The host 102 performs discovery on the virtual center server 106 through a connection 150 to determine the objects in the virtual network 104. The virtual center server includes an event database history that records event in the virtual network 104. The host 102 monitors changes in the virtual network 104 by communicating with the virtual center server 106 to get all the events from the events database history 142 and records the changes in a changes log 132. The host 102 includes catalog information 150.

The results of the discovery are stored in the cache 120. The cache 120 includes discovery data 136. In one example, some or parts of the discovery are initiated using the user interface 122.

Figure 2:
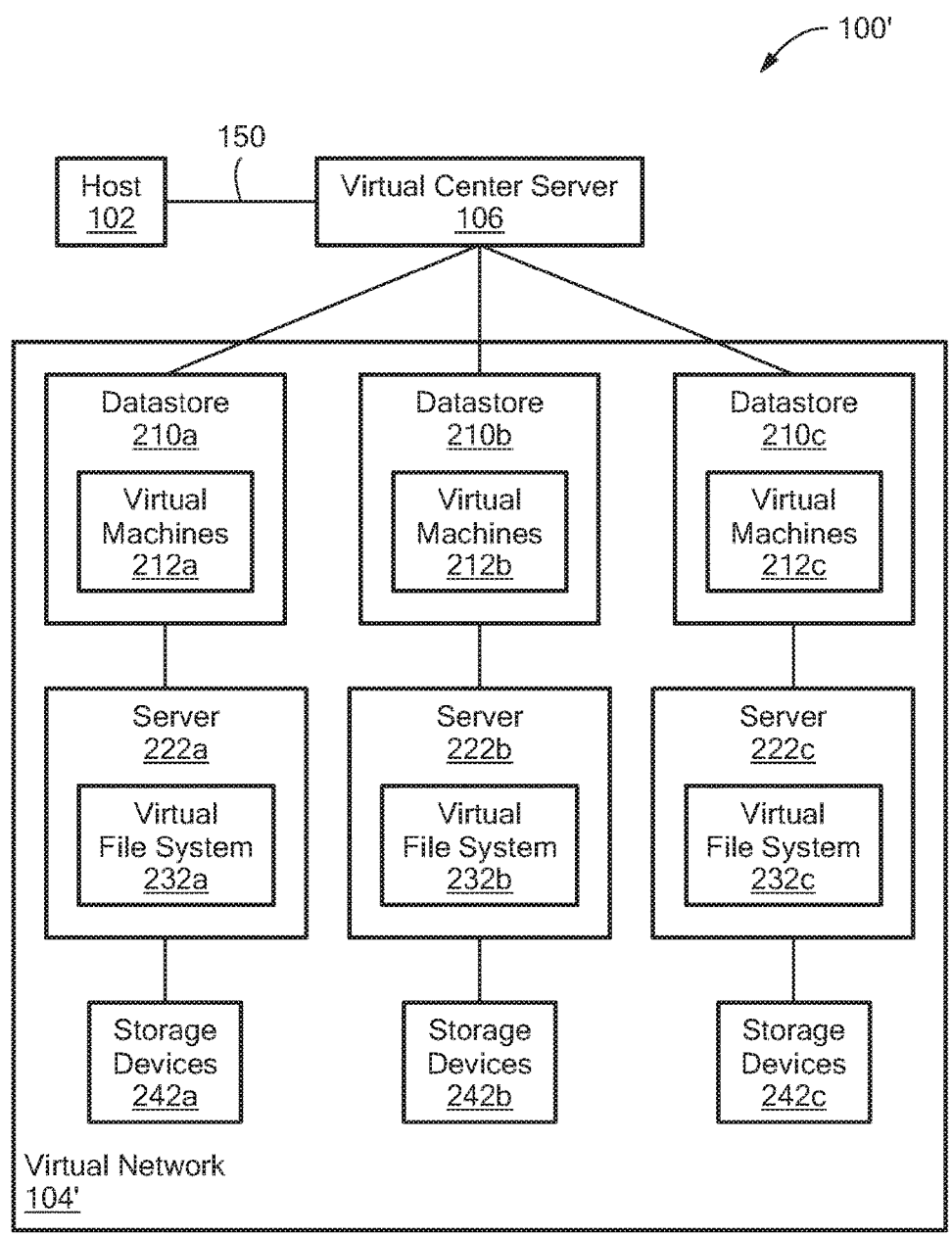
FIG. 2 is a block diagram of a particular example of the system of FIG. 1.

Referring to FIG. 2, one particular example of the system 100 is a system 100'. The system 100' includes the host 102, the virtual center server 106 and a virtual network 104'. The virtual network 104' includes data stores 210$a$-210$c$ includes virtual machines 212$a$-212$c$, each connected to a respective server 222$a$-222$c$. In one example, one or more of the servers 222$a$-222$c$ is a VMWARE® ESX®.

In one example, each of the servers 222$a$-222$c$ includes a respective virtual file system 232$a$-232$c$. In one example, one or more of the virtual file systems 232$a$-232$c$ is a VMWARE® Virtual File Management System (VFMS).

Each server 222$a$-222$b$ is coupled to a respective storage devices 242$a$-242$c$.

Figures 3, 4:
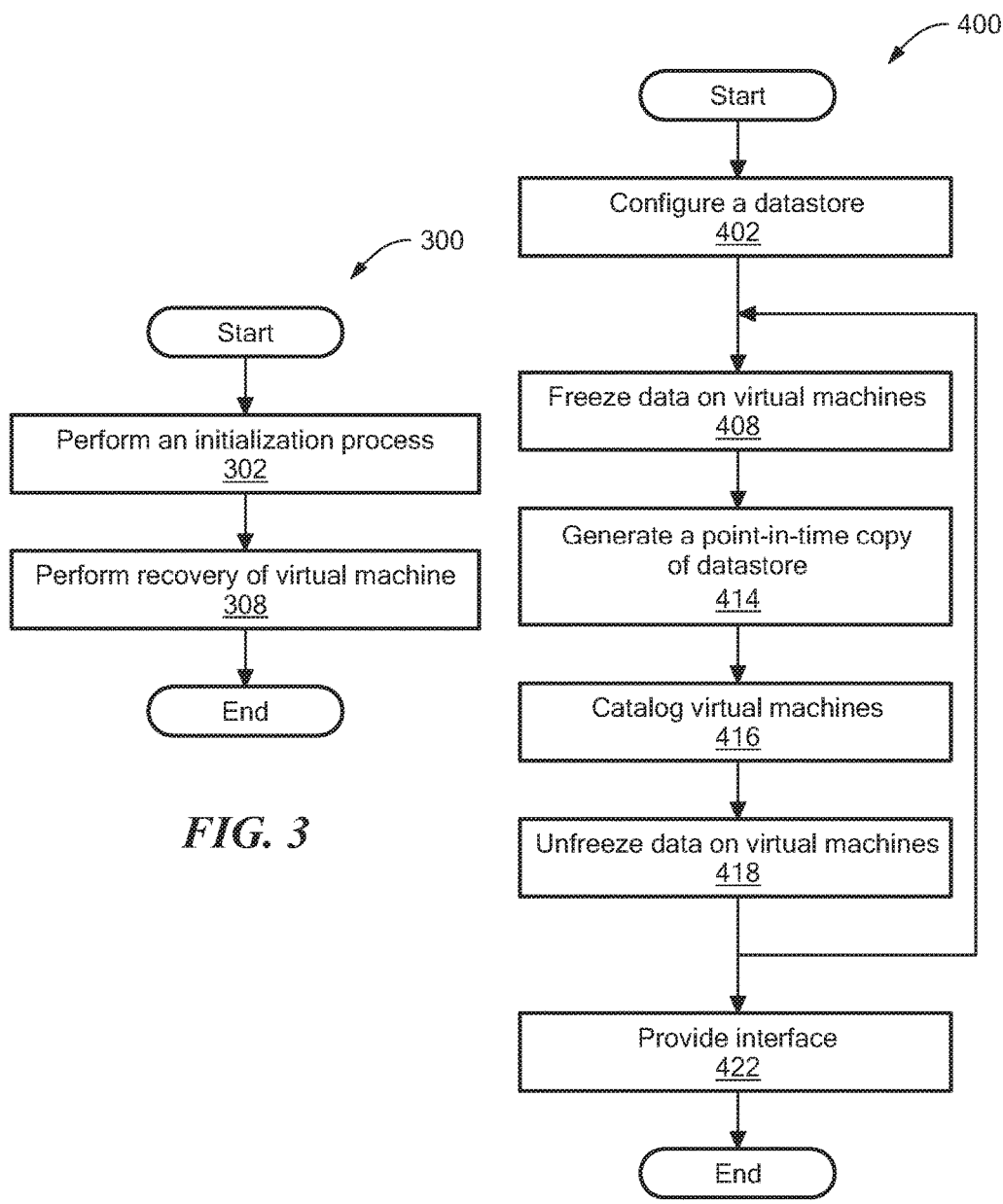
FIG. 3 is a flowchart of an example of a process to restore a virtual machine from a copy of a datastore.
FIG. 4 is a flowchart of an example of a process to perform initialization.

Referring to FIG. 3, an example of a process to restore a virtual machine from a copy of a datastore is a process 300. Process 300 performs an initialization process (302) and performs recovery of a virtual machine on the datastore (308).

Referring to FIG. 4, an example of the initialization process (302) is a process 400. Process 400 configures a datastore (402). For example, a VMWARE® datastore is configured to be protected by a continuous data protection system with an appropriate recovery point objective based on a user need. Process 400 freezes data on the virtual machines by generating snapshots of the virtual machines (408).

Process 400 generates a point-in-time copy of the datastore (414). The point-in-time copy of the datastore includes point-in-time copies of the virtual machines. In one example, the point-in-time copy of the datastore is a continuous data protection copy of a VMWARE® data store.

Process 400 catalogs information of the virtual machines (416) by storing the information at the catalog information 150. For example, process 400 catalogs virtual machine details such as at least one of a name of the virtual machine, basic input/output system (BIOS) universally unique identifier (UUID), instance UUID, location UUID, power state, virtual machine snapshot information, and so forth. In a further example, for each virtual machine, all the virtual machines files and its attributes are cataloged. For each virtual machine all the virtual machines disks and its attributes are cataloged. In other examples, point-in-time copy information is catalogued (e.g., devices which include the copies such as, for example, in EMC® RECOVERPOINT®, recover point bookmark information).

After the point-in-time of the copy is generated, process 400 unfreezes the virtual machines by removing the snapshots of the virtual volumes (418).

Processing blocks 408, 414, 416 and 418 may be repeated as often as designated by a user to make point-in-time copies of the data store.

Process 400 provides an interface (422), for example, to a user that displays the point-in-time copies of the datastore and the virtual machines that are included in the data store.

Figure 5:
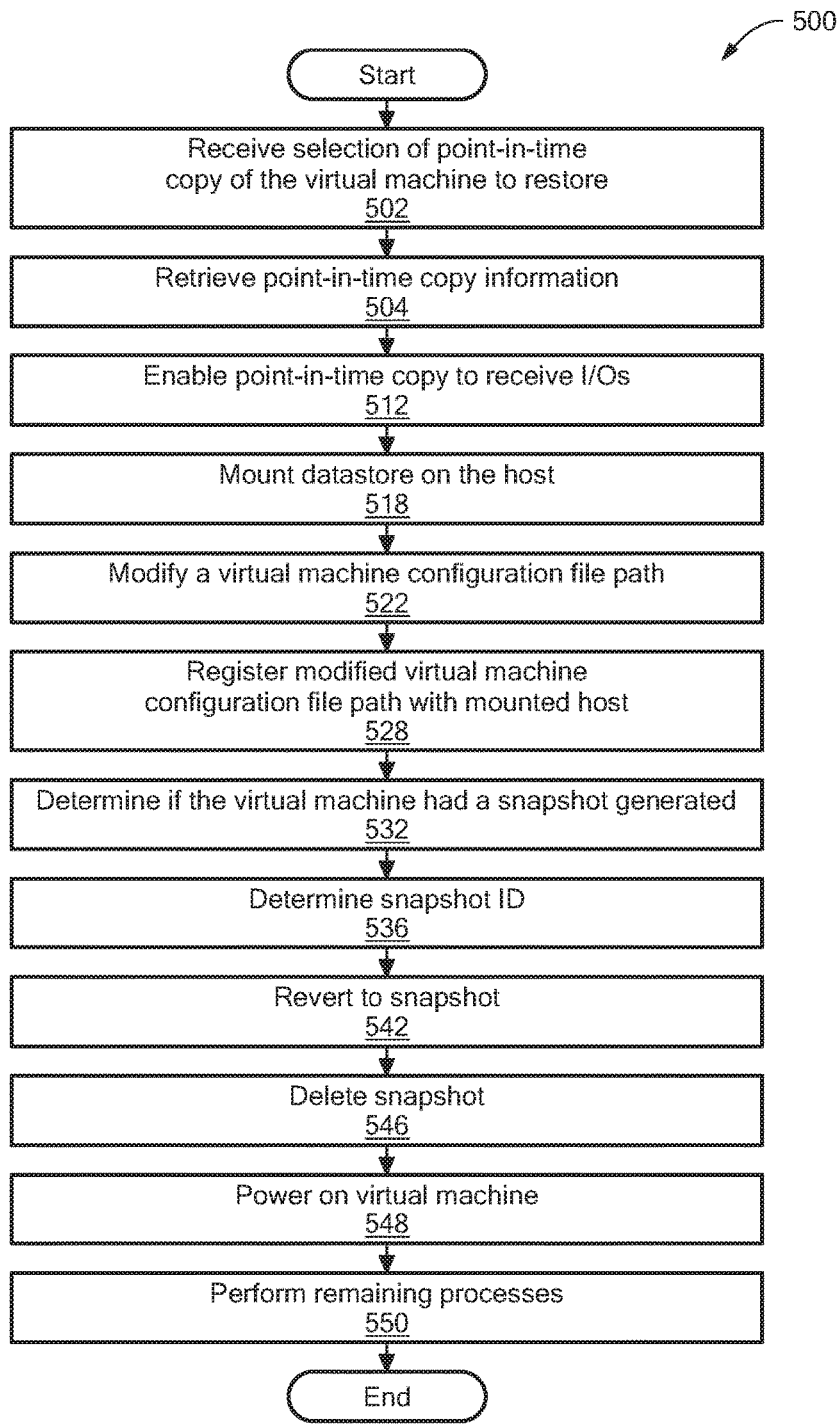
FIG. 5 is a flowchart of an example of a process to perform recovery of the virtual machine.

Referring to FIG. 5, an example of a process to recovery a virtual machine is a process 500. Process 500 receives a selection of a point-in-time copy of the virtual machine to restore (502). For example, a user selects an appropriate point-in-time copy of the virtual machine to restore from the catalog and selects a host where the virtual machine is to be restored and issues a restore command. The point-in-time copy of the virtual machine is part of the point-in-time copy of the datastore generated in the processing block 414.

Process 500 retrieves point-in-time copy information by reading the catalog information for the copy selected (508) from the catalog information 150. Process 500 enables the point-in-time copy to receive I/Os for the host where the virtual machine will be restored (512). I/Os are input/output (I/Os) requests (e.g., read I/O requests and write I/O requests)

Process 500 mounts the datastore on the host (518). For example, a re-signature command is used to re-signature the volume. For example, re-signature of the volume will internally mount the datastore on the host.

Process 500 modifies the virtual machine configuration file path (522). For example, the virtual machine configuration file path is read and modified to point to the mounted pointed-in-time datastore copy.

Process 500 registers the modified virtual machine configuration file with the mounted host (528) and determines if the virtual machine had a snapshot generated (532).

Process 500 determines snapshot ID of the snapshot of the virtual machine (536) and reverts to the virtual machine snapshot (542).

Process 500 deletes the virtual snapshot (546). The result is a virtual machine consistent point-in-time image of a virtual machine which is stored on the point-in-time copy of the datastore.

Process 500 powers on the virtual machine (548). Once the virtual machine is powered on the restore process is complete from a user perspective. The remaining processes are performed in the background, for example, those described in processing block 550.

Process 500 performs remaining processes (550). For example, a relocation of a virtual machine is initiated (e.g., using the VMWARE® storage VMOTION® API to move the VM back to the original datastore where it is to be restored. Since the VMOTION® API does live migration of storage, the virtual machine is still usable during the migration process). In further examples, once the migration is done, the snapshot point-in-time copy of datastore is unmounted, the devices which hold the point-in-time copy of the datastore are disabled and all the changes which were made to it during the migration process are rolled back.

By using the processes described herein a virtual machine, which is part of a data store that 10 Gigabytes or more in size, may be restored within a minute or two of receiving a selection of a point-in-time copy to restore.

Figure 6:
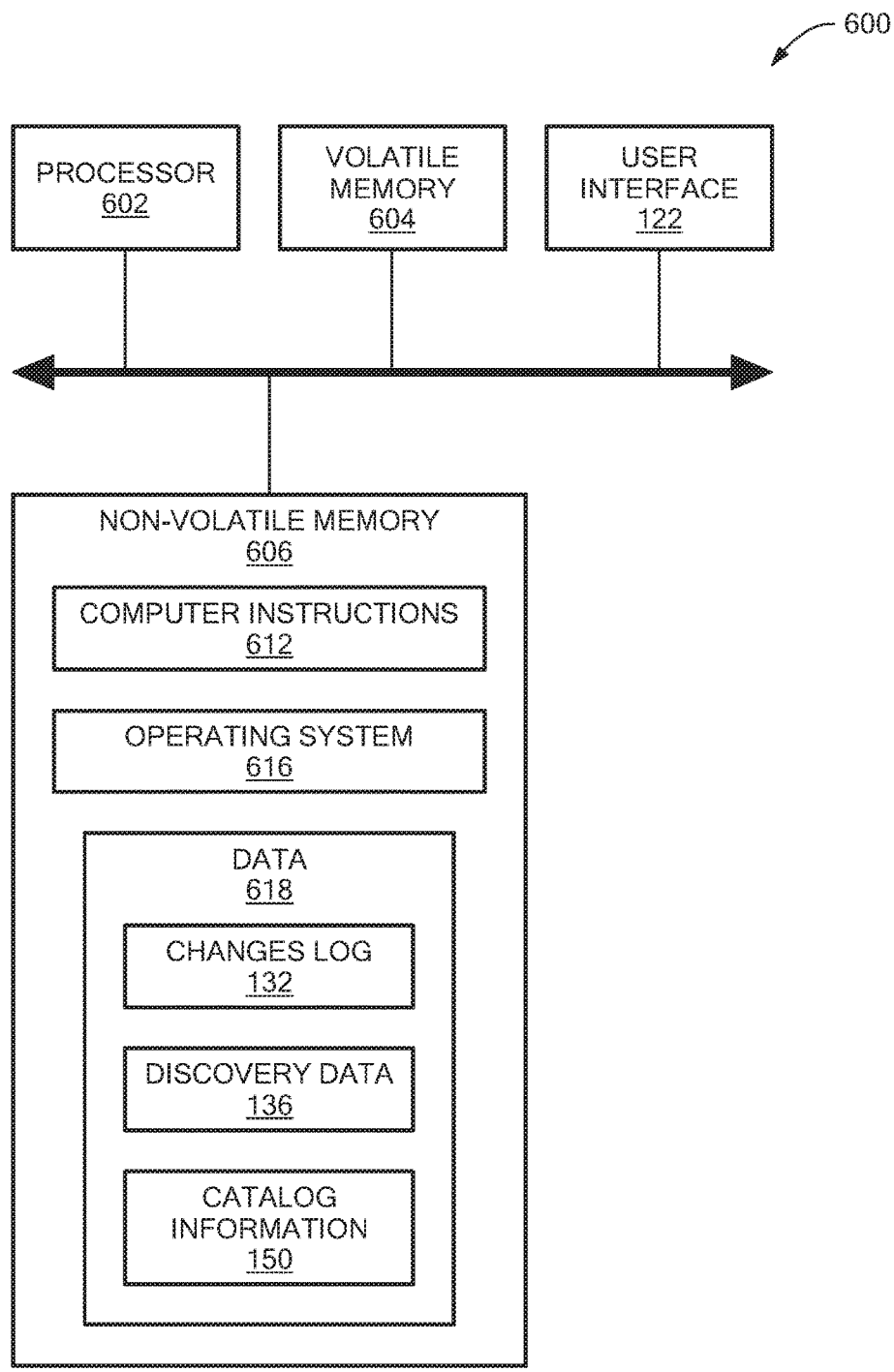
FIG. 6 is a computer on which the processes of FIGS. 3 to 5 may be implemented.

Referring to FIG. 6, in one example, a computer 600 includes a processor 602, a volatile memory 604, a non-volatile memory 606 (e.g., hard disk) and the user interface (UI) 122 (e.g., a mouse, a keyboard, a display, touch screen and so forth). The non-volatile memory 606 stores computer instructions 612, an operating system 616 and data 618 including the changes log 132, the discovery data 136 and catalog information 150. In one example, the computer instructions 612 are executed by the processor 602 out of volatile memory 604 to perform all or part of the processes described herein (e.g., processes 300 to 500).

The processes described herein (e.g., processes 300 to 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300 to 500 are not limited to the specific processing order of FIGS. 3 to 5, respectively. Rather, any of the processing blocks of FIGS. 3 to 5 may be re-ordered, combined or removed, performed in parallel or in serial, as necessary, to achieve the results set forth above.

The processing blocks (for example, in the processes 300 to 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic devices or logic gates.

Elements of different embodiments described herein may be combined to form other embodiments not specifically set forth above. Other embodiments not specifically described herein are also within the scope of the following claims.

What is claimed is:

1. A method to restore a virtual machine comprising:
   receiving a selection of a point-in-time copy of the virtual machine to restore the selection being made from a plurality of point-in-time copies of virtual machines stored, a point-in-time copy of a datastore comprising the plurality of point-in-time copies of the virtual machines;
   retrieving point-in-time copy information, from catalog information, the point-in-time copy information being associated with the point-in-time copy of the virtual machine selected to restore;
   enabling the point-in-time copy of the virtual machine to receive I/Os for a host where the virtual machine will be restored;
   mounting the datastore on the host;
   modifying a virtual machine configuration file path to point to the point-in-time copy of the datastore;
   registering the modified virtual machine configuration file path with the host;
   determining a snapshot ID of a snapshot of the virtual machine; and
   reverting to the snapshot of virtual machine.

2. The method of claim 1, further comprising:
   configuring the datastore;
   generating snapshots of virtual machines associated with the datastore;
   generating the point-in-time copy of the datastore; and
   cataloging information on the virtual machines to store in the catalog information.

3. The method of claim 2, further comprising providing an interface to allow the selection of the point-in-time copy of the virtual machine to restore by a user.

4. The method of claim 3 wherein providing the interface to allow the selection of the point-in-time copy of the virtual machine to restore comprises providing the interface to allow selection of the point-in-time copy of the virtual machine to restore and to allow selection of the host where the virtual machine will be restored.

5. The method of claim 2 wherein the cataloging information on the virtual machines comprises cataloging virtual machine details comprising at least one of a name of the virtual machine, basic input/output system (BIOS) universally unique identifier (UUID), instance UUID, location UUID, power state, virtual machine snapshot information.

6. The method of claim 1, further comprising restoring the virtual machine within a minute of receiving a selection of a point-in-time copy of the virtual machine to restore,
   wherein the virtual machine is part of a datastore that is at least 10 Gigabytes.

7. An article comprising:
   a non-transitory machine-readable medium that stores executable instructions to restore a virtual machine, the instructions causing a processor to:
   receive a selection of a point-in-time copy of the virtual machine to restore the selection being made from a plurality of point-in-time copies of the virtual machines, a point-in-time copy of a datastore comprising the plurality of point-in-time copies of the virtual machines;
   retrieve point-in-time copy information, from catalog information, the point-in-time copy information being associated with the point-in-time copy of the virtual machine selected to restore;
   enable the point-in-time copy of the virtual machine to receive I/Os for a host where the virtual machine will be restored;
   mount the datastore on the host;
   modify a virtual machine configuration file path to point to the point-in-time copy of the datastore;
   register the modified virtual machine configuration file path with the host;
   determine a snapshot ID of a snapshot of the virtual machine; and
   revert to the snapshot of virtual machine.

8. The article of claim 7, further comprising instructions causing the processor to:
   configure the datastore;
   generate snapshots of virtual machines associated with the datastore;
   generate the point-in-time copy of the datastore; and
   catalog information on the virtual machines to store in the catalog information.

9. The article of claim 8, further comprising instructions causing the processor to provide an interface to allow the selection of the point-in-time copy of the virtual machine to restore by a user.

10. The article of claim 9 wherein the instructions causing the processor to provide the interface to allow the selection of the point-in-time copy of the virtual machine to restore comprises instructions causing the processor to provide the interface to allow selection of the point-in-time copy of the virtual machine to restore and to allow selection of the host where the virtual machine will be restored.

11. The article of claim 8 wherein the instructions causing the processor to catalog information on the virtual machines comprises instructions causing the machine to catalog virtual machine details comprising at least one of a name of the virtual machine, basic input/output system (BIOS) universally unique identifier (UUID), instance UUID, location UUID, power state, virtual machine snapshot information.

12. The article of claim 7, further comprising instructions causing the processor to restoring the virtual machine within a minute of receiving a selection of a point-in-time copy of the virtual machine to restore, wherein the datastore is at least 10 Gigabytes.

13. An apparatus, comprising:
electronic hardware circuitry to restore a virtual machine, the circuitry configured to:
receive a selection of a point-in-time copy of the virtual machine to restore, the selection being made from a plurality of point-in-time copies of the virtual machines, a point-in-time copy of a datastore comprising the plurality of point-in-time copies of the virtual machines;
retrieve point-in-time copy information, from catalog information, the point-in-time copy information being associated with the point-in-time copy of the virtual machine selected to restore;
enable the point-in-time copy of the virtual machine to receive I/Os for a host where the virtual machine will be restored;
mount the datastore on the host;
modify a virtual machine configuration file path to point to the point-in-time copy of the datastore;
register the modified virtual machine configuration file path with the host;
determine a snapshot ID of a snapshot of the virtual machine; and
revert to the snapshot of virtual machine.

14. The apparatus of claim 13 wherein the circuitry comprises at least one of a processor, a memory, programmable logic devices and logic gates.

15. The apparatus of claim 13, further comprising circuitry configured to:
configure the datastore;
generate snapshots of virtual machines associated with the datastore;
generate the point-in-time copy of the datastore; and
catalog information on the virtual machines to store in the catalog information.

16. The apparatus of claim 15, further comprising circuitry configured to provide an interface to allow the selection of the point-in-time copy of the virtual machine to restore by a user.

17. The apparatus of claim 16 wherein the circuitry configured to provide the interface to allow the selection of the point-in-time copy of the virtual machine to restore comprises circuitry configured provide the interface to allow selection of the point-in-time copy of the virtual machine to restore and to allow selection of the host where the virtual machine will be restored.

18. The apparatus of claim 15 wherein the circuitry configured to catalog information on the virtual machines comprises circuitry configured to catalog virtual machine details comprising at least one of a name of the virtual machine, basic input/output system (BIOS) universally unique identifier (UUID), instance UUID, location UUID, power state, virtual machine snapshot information.

19. The apparatus of claim 13, further comprising circuitry configured to restoring the virtual machine within a minute of receiving a selection of a point-in-time copy of the virtual machine to restore, wherein the datastore is at least 10 Gigabytes.

* * * * *